Feb. 13, 1934.  A. S. LACK  1,947,052
POWER TRANSMISSION COUPLING
Filed July 17, 1929   2 Sheets-Sheet 1
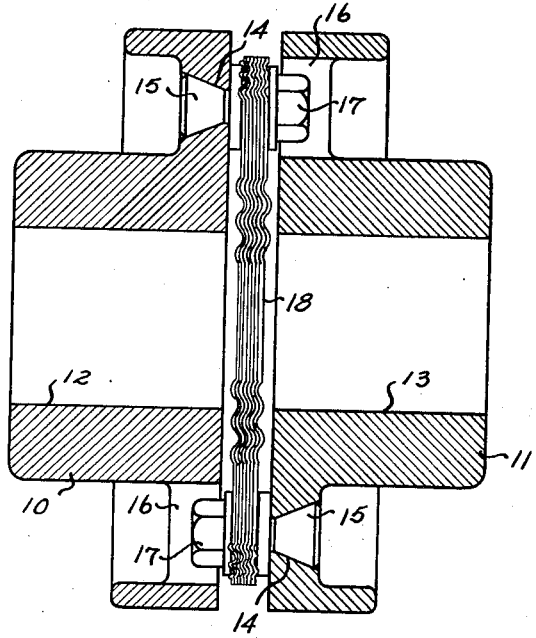
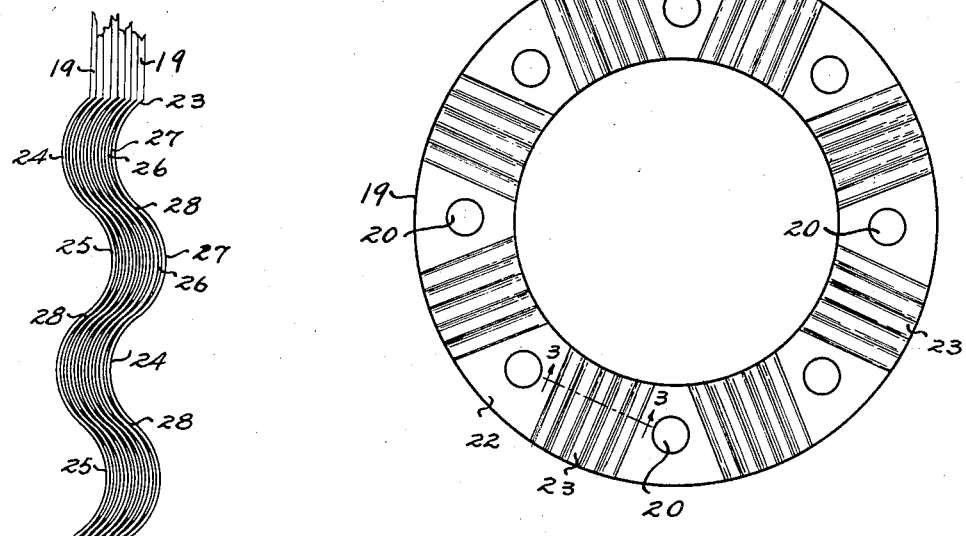
INVENTOR
ARNOLD S. LACK
BY
ATTORNEY Feb. 13, 1934.   A. S. LACK   1,947,052
POWER TRANSMISSION COUPLING
Filed July 17, 1929   2 Sheets-Sheet 2

INVENTOR
ARNOLD S. LACK
BY
Roy M Eiders
ATTORNEY

Patented Feb. 13, 1934

1,947,052

UNITED STATES PATENT OFFICE 1,947,052

POWER TRANSMISSION COUPLING

Arnold S. Lack, Beloit, Wis., assignor to Fairbanks, Morse & Co., Chicago, Ill., a corporation of Illinois Application July 17, 1929. Serial No. 378,871

7 Claims. (Cl. 64—96)

This invention relates to improvements in power-transmission couplings, and particularly to flexible coupling means used to transmit power from a driving member to a driven member, for example, a pair of substantially co-axial power shafts.

In a flexible coupling serving as a shaft connector, it is essential to provide sufficient flexibility of connection between the coupled shafts, to compensate for unavoidable misalignment of the shafts. It is also essential to provide sufficient torque-carrying capacity between the connected elements, to withstand adequately all possible overload torques. In the older prevailing types of couplings, in order to increase the torque-carrying capacity of the coupling, the flexibility has been, in some cases, decreased to such an extent that the coupling practically constituted a rigid device, which condition exposed the coupled shafts to dangerously excessive deflections and stresses. Further, such an arrangement of coupled shafts, destroyed the shock absorbing capacity of the flexible means, to cope with sudden overload torques.

An object of the present invention is to provide an improved coupling, possessing increased flexibility, improved capacity for absorbing torsional shocks without damage, and embodying means enabling an alteration of critical torsional speeds to damp out undue vibrations.

A further object of the invention is to provide an improved coupling, embodying means for reducing the transmission of torsional vibration, or for damping the effect of vibrations produced in one coupled rotating mass, and minimizing the transmission of such vibrations to the other coupled rotating mass.

Figure 4:
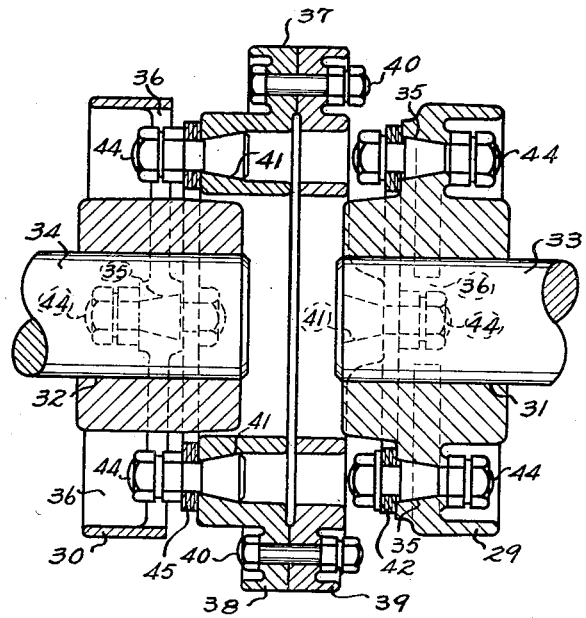
Figure 5:
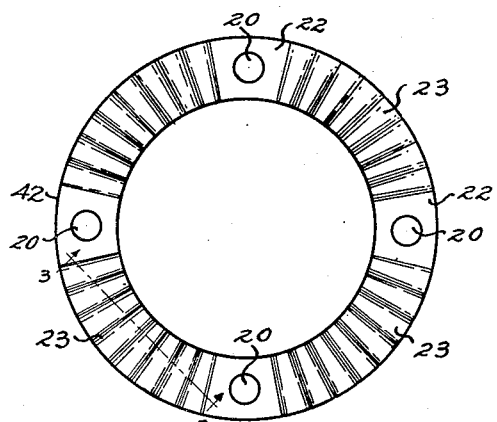

Further objects and advantages will appear from the following detailed description of parts and the accompanying drawings, in which:

Fig. 1 is a transverse section, partly in elevation, of the improved power-transmission coupling; Fig. 2 is a plan view of the improved flexible means, and showing an arrangement and grouping of the corrugations, where the member is to be employed with certain prevailing types of coupling; Fig. 3 is a diagrammatic showing, in the nature of an enlarged, fragmentary section along lines 3—3 of Figs. 2 and 5, and showing particularly the arcuate curvature of adjacent elements or laminations; Fig. 4 is a transverse section, of a modified form of coupling constructed in accordance with the present invention; Fig. 5 is a plan view of a preferred form of flexible connecting means as employed in the construction of Fig. 4; and Fig. 6 is a diagrammatic showing of the coupling of Fig. 4, and indicating, particularly, the universal joint relation between the members to permit transmission of power between relatively misaligned shafts.

It will, of course, be understood that the present detailed description of parts and the accompanying drawings, relate only to certain preferred executional embodiments of the present invention, and that substantial changes may be made in the described construction and arrangement of the parts without departing from the spirit and underlying principles of the invention.

Referring by numerals to the drawings, the improved coupling (as seen in Figs. 1, 2 and 3) comprises elements 10 and 11, provided, respectively, with bores 12 and 13, in which power transmission shafts (not shown) may be keyed or otherwise secured. Openings 14 are disposed about each of the elements for the reception of coupling connecting bolts 15. By preference, the openings 14 and bolts 15 are constructed with corresponding, tapered portions, to facilitate the insertion and removal of the bolts, and consequently the replacement of flexible connecting means without disturbing the associated shafts, the manner of such replacement hereinafter clearly appearing. Openings 16 are placed alternately around each of the elements 10 and 11 and are adapted to permit free movement of the heads 17 of the bolts 15, when the elements are misaligned, as well as to facilitate the application of a wrench to the bolt heads. A flexible interconnecting means 18 is disposed between the elements 10 and 11, and is composed, preferably, of a plurality of thin annular laminations 19, which may be formed of sheet steel or any suitable resilient, flexible material. Each lamination 19 of the group thereof, is provided with openings 20 (as seen in Fig. 2 or 5) through which the bolts 15 extend in order to secure the laminations in compact, assembled relation, and in assembly with the members 10 and 11. A relatively high degree of flexibility is attained by securing the laminated group alternately to each of the coupling elements.

Figure 6:
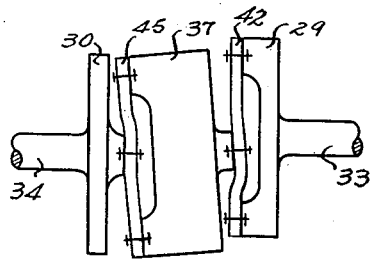

In an alternate construction shown in Figs. 4, 5 and 6, the four-bolt or universal joint principle is employed in order to insure a more flexible shaft connector. Referring by numerals to these drawings, the modified coupling comprises coupling elements or heads 29 and 30, provided, respectively, with bores 31 and 32, in which power transmission shafts 33 and 34 are keyed or otherwise secured. These heads 29 and 30 may be identical in construction and are so shown in Fig. 4, although apparently different due to their relative angular displacement, as will hereinafter appear. Each of heads 29 and 30 is provided with tapered bolt holes 35 and recesses 36. In the example shown in Fig. 4, the openings 35 are disposed in each head member, substantially 180 degrees apart, for a purpose that will hereinafter appear. Between the elements 29 and 30 and spaced therefrom, is a coupling member 37, which is composed of separable members 38 and 39, detachably secured together by bolts 40, or the equivalent. In each of the members 38 and 39, tapered openings 41 are disposed, and spaced 180 degrees from each other. It will be readily seen that, in Fig. 4, the detachable members are secured together in such a manner that the openings 41, of each member, are out of register with the openings 41 in the companion member, and are relatively staggered, being spaced 90 degrees apart. Likewise, in this coupling assembly, the openings 35 in the member 29 are disposed at substantially a right angle with respect to the openings 41 in the member 39. The same arrangement exists on the other extremity of the coupling, the bolt holes being there disposed as above mentioned.

A flexible interconnecting means 42 is disposed in the construction seen in Fig. 4, between the head 29 and the member 39. This flexible means is constructed similarly to the structure 19 shown in Fig. 2, with the exception that the present structure 42 is provided, by great preference, with not more than four bolt holes 20, instead of the more numerous holes 20 as seen in Fig. 2. But it will, at once, be seen that the flexible member 42 (Fig. 5), may replace the structure 19 (Fig. 2) with the noted advantages. By the arrangement last described, the corrugations 23 may be employed in greater number, and occupy a greater distance between adjacent bolt holes, and thereby insure a greater flexibility of the laminated structure.

The preceding description of the assembly shown in Fig. 4 covers an arrangement of parts in which the companion members 38 and 39 of the floating portion of the assembly, are angularly displaced 90 degrees. It will, however, be obvious that the parts shown may, if desired, be assembled in such relation that the tapered openings 41 are in register, instead of being staggered, as shown.

It will be readily seen that the laminated means 42 serves to interconnect the head member 29 and the member 39 by means of tapered bolts 44. These bolts rigidly secure the flexible structure to the head member and the member 39 in such a manner that practically a universal joint relation exists between these parts. For it will be seen that the bodies of a pair of the bolts 44 are secured in the opening 41 of the separable member 39, and the remaining bolts 44 have their body portions secured in the head 29. Likewise, a flexible means 45, preferably identical in structure to the means 42, disposed between the head 30 and the separable member 38, and is alternately connected to each member, respectively, by means of tapered bolts 44. It will be readily understood that the preferred arrangement of connecting the parts together provides a double universal joint connection, which permits substantial misalignments of the coupled shafts (Fig. 6) without placing the coupling members or shafts under excessive stresses.

It will be seen that the tapered fitting of the bolts in the bolt holes, reduces the stress in these bolts to admissible values, and serves to avoid loosening of the bolts in the coupling rings. The tapered bolts provide a wedging action between the bolts and bolted members in a manner to dispense with separate lock-washers or nuts, and to assure a substantial area of bolt engagement, to the end of minimizing bolt stresses. Compactness of assembly is further promoted by the absence of projecting bolt heads. It will, of course, be understood that the bolts may be arranged to provide a universal joint effect, in the coupling shown in Fig. 1, without departing from the underlying principle of the invention. In fact, such an arrangement insures a high degree of flexibility of the parts, and permits the use of larger bolts to carry the stress incident to these types of couplings.

Proceeding now to a more detailed description of the flexible laminated structures of Figs. 2, 3 and 5, it will be seen that adjacent the openings 20 of each lamination 19 is provided, preferably, a flat portion 22 which constitutes a substantially plane bearing surface for attachment of the assembly bolts. Between each pair of holes 20 are formed pleated portions 23, which are disposed in groups, and arranged radially about the lamination, as seen in Figs. 2 and 4. These corrugations are formed on substantially uniform radii of curvature, on both sides of each lamination, and thus form a serpentine or furrowed surface comprising arcuate portions 24, (Fig. 3) and relatively inverted arcuate portions 25. Since the laminations are formed with their corresponding arcuate portions of substantially equal radii, there will exist an appreciable clearance 26 at the highest points 27 of each of the adjacent arcuate portions 24 and 25. A quite different condition prevails at the points 28 where the portions 24 adjoin the arcuate portions 25. Practically no clearance exists at these points; thus providing a sliding frictional contact between these portions of the adjacent laminations, and producing a resistance to relative movement of the laminations, as will hereinafter appear.

In the examples illustrated, (Figs. 2 and 5) the pleated surfaces 23 are of arcuate section, although it will be readily seen that any practical, alternative formation, such, for example, as radially angulate or fluted corrugations, may be used, without departing from the underlying principle of the invention. The pleated or fluted construction of the laminations 19, results in a substantial length of metal between bolt centers; this portion being capable of extension and restriction between such centers, responsively to torque differential between the coupled shafts, and to permit the coupling to adjust itself to any misalignment, either angularly or radially. These flexures and deformations of the corrugations about the diameter of the lamination, occur without any interference or diminution of the torque-carrying capacity of the flexible portion of the device, and without placing the laminations and bolts under excessive stresses and strains, as would result from similar causes in the older types of coupling construction, such as those including a flexible portion constructed of flat laminations. It will be readily understood that the ability of the pleats to stretch and flex to suit the particular operating conditions of the coupling, has the effect of increasing the torsional flexibility of the couple to an extent not obtainable by employing the usual types of coupling heretofore offered to the trade.

With a coupling embodying the present improvements, it is possible to couple a Diesel engine operating at critical torsional speed, to an alternator, with the advantage in operation that the critical vibrations caused by the engine, are not transmitted to the rotor of the alternator, because these vibrations are damped in the coupling. Such damping effect is produced by the friction existing between the laminations at the points 28, during oscillation of one-half or less, of the laminated portion of the coupling. A certain further degree of damping effect is obtained, due to the inherent resilience, or spring effect of the corrugated portions.

In the older types of couplings, in order to attain a moderate degree of flexibility, it was often necessary to weaken, or decrease the effective section of the flexible elements, thereby decreasing the torque carrying capacity of the coupling, because such a condition placed the flexible element under excessive stress. Usually, the excessive torque was carried by a large number of bolts, which were operating under strains so excessive as to prejudice safe operation.

The present improved construction insures a maximum flexibility, without decreasing or weakening the flexible section. Therefore a smaller number of the bolts 15 are needed, because the flexible, laminated structure will carry a sufficient amount of the torque, to relieve the bolt strain to an entirely safe extent. In the example described, and as illustrated in Fig. 2, there are eight bolts shown, which correspond to the construction used in the older couplings, but by the use of a corrugated construction to increase the flexibility, the number of bolts may be decreased (as seen in Fig. 5), at least to four, without seriously decreasing the torque-carrying capacity of the couples. This results from the fact, that decreasing the number of bolts, creates a greater angular distance between bolt centers, and provides an increased length and area of metal in which to form pleats, and enables increasing the section of each of the laminations, without impairing the flexibility of the couple. In cases where there is required a greater driving area of metal than can conveniently be provided by four bolts, a double bolt arrangement may be used at substantially the same four points, thus maintaining the universal joint effect, and the length of corrugated metal between certain of the bolts.

By the novel arrangement of the pleated laminations, any desired damping effect and torsional flexibility may be attained by the simple expedient of varying the curvature or angulate relation between the pleats, thus making possible an assembly that may be constructed with but minor variations, completely to satisfy any particular or peculiar operating condition of any coupled unit.

Further features of novelty incidental to the construction illustrated are of practical importance. It is to be noted that both coupling elements are practically identical; further that the arrangement of the bolts is such that removal, inspection and replacement of the laminated group, is possible without moving either of the coupled units, such as an engine and alternator, and without disturbing their connecting shafts.

The arrangement provides a simple structure which is easily manufactured and assembled, and which may be used at a comparatively small maintenance expense. While the flexible portion of the structure has been described as employed with certain particular types of coupling assembly, it will be obvious that the flexible metal structure described may be made to fit the older standard types of coupling, and supplied to the trade, as such, for use in existing installations. It will be seen that the present coupling is equally adapted for operation in either direction of rotation. Further advantages and uses, in fulfillment of the objects stated, will readily suggest themselves to those skilled in the art.

I claim as my invention:

1. A flexible member for connecting the shaft-mounted portions of a flexible coupling, and including an assembly of substantially radially corrugated sheet-metal laminations disposed in incompletely nested relation, the adjacent corrugations of each lamination being contiguously grouped and reversely curved, said assembly constituting an angularly and laterally flexible annular ring, each lamination thereof provided with peripheral plane portions between the groups of its corrugations, the laminations being assembled with the corrugations of corresponding groups in frictional relation over spaced zones within each group and normally spaced from each other between such zones, and means connecting the plane portions adjacent each group of corrugations, to opposite shaft-mounted coupling portions.

2. A flexible member for absorbing torsional vibrations, and connecting the shaft-mounted portions of a flexible coupling, said member including a laminated metal ring of annular form, having corrugations therein of a substantially radial trend, the ring being assembled with the corrugations of the individual laminations arranged contiguously in defined groups, with the corrugations of corresponding groups, in adjacent laminations, in frictional engagement, for working one upon another, over restricted areas or zones, and spaced between such zones, and holding members by which the ring is connected to said shaft-mounted portions, the holding members being located between the groups of corrugations, with adjacent holding members connected to opposite shaft-mounted portions, and constituting the sole lamination assembly expedient.

3. A device for use with a flexible coupling and adapted for damping torsional vibration, said device including an angularly and laterally flexible annular ring formed of incompletely nested laminations, each having peripheral bolt openings and a relatively closely corrugated portion providing a plurality or group of adjacent substantial radial corrugations between adjacent bolt openings, the laminations being assembled with the correspondingly grouped corrugations interengaging each other in frictional relation over variably spaced areas or zones, with adjacent laminations free of contact between such zones, and bolts engaging adjacent bolt openings and extending from opposite sides of the ring for operative connection to the respective coupled shafts.

4. Apparatus for damping torsional vibrations and flexibly connecting the shaft-mounted portions of a flexible coupling, and including a corrugated and laminated sheet metal ring, the corrugations of each lamination being formed on a uniform radius, and arranged in groups each group including a plurality of contiguous substantially radial corrugations, the laminations being assembled with the corrugations of corresponding groups incompletely nested, with portions thereof normally appreciably spaced, in assembly, longitudinally of the axis of rotation of the coupling, and the intervening portions normally frictionally contacting over restricted vibration-damping zones.

5. A coupling for rotatable shafts, including spaced shaft mounted heads, an intermediate coupling head, flexible members for connecting the heads and each including a laminated metal ring of radially corrugated construction, and bolts of headless type, provided with tapered shanks countersunk within the coupling heads, and alternately connecting each ring to a coupling head on an opposite side thereof.

6. A device for connection between shaft-mounted portions of a flexible coupling, consisting of a laminated metal assembly, the laminæ thereof being formed of resilient sheet metal, and adjacent laminæ each having closely grouped, substantially radial, pleated portions of alterable dimension, said portions being of substantially radial trend, the corresponding groups of pleats in adjoining laminæ being contiguous only over restricted spaced contact areas, with corresponding pleats of adjacent laminæ normally spaced slightly from each other between such areas, and means so securing the laminæ together as to permit relative deformation and frictional engagement of a plurality of the pleats of corresponding groups of adjacent laminæ.

7. A combined flexible joint and universal coupling assembly for related rotatable driving and driven shafts, said assembly comprising a pair of coupling members mounted respectively on the driving and driven shafts, a laminated flexible structure, associated with each of said coupling members, a pair of rigid connecting discs each connected with one of said flexible structures, the laminations of each flexible structure being formed of sheet metal, and having bolt receiving apertures evenly peripherally disposed thereon, and corrugated substantially radially between said apertures, with the corrugations of each lamination closely disposed in defined groups between the adjacent bolt apertures, the adjacent laminations being arranged with their corrugations of corresponding groups normally partly contacting, and partly in spaced relation to provide a plurality of spaced zones of frictional engagement in each group of corrugations, bolts extending through alternate bolt apertures from opposite sides of each flexible structure for operatively connecting the coupling members in staggered relation, whereby to permit relative universal movement of said shaft-mounted members, and holding means distinct from said bolts, for securing said connecting discs to each other.

ARNOLD S. LACK.